(No Model.) 2 Sheets—Sheet 1.
J. C. HORTON.
COMBINED PLOW AND HARROW.
No. 379,164. Patented Mar. 6, 1888.
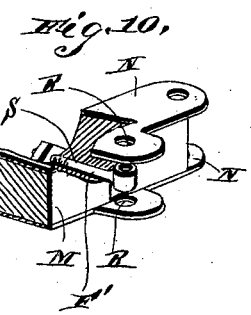
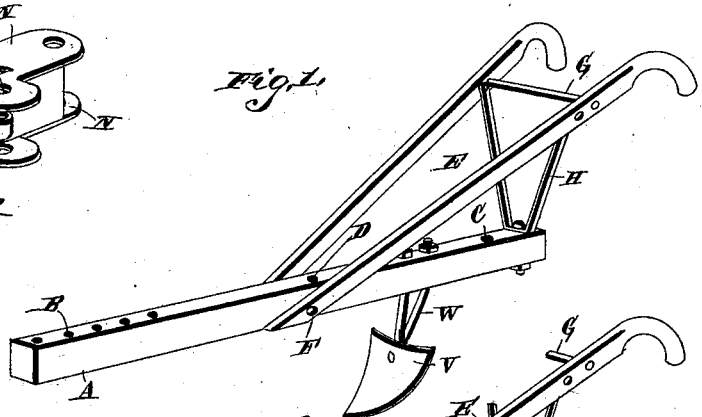
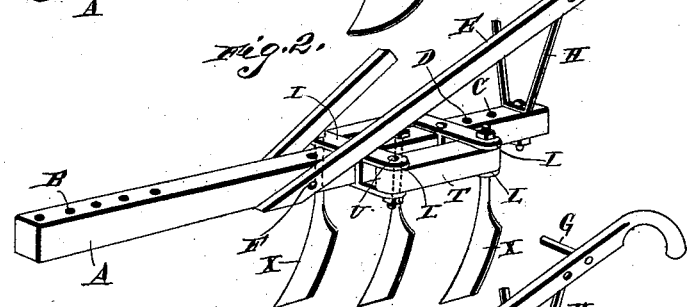
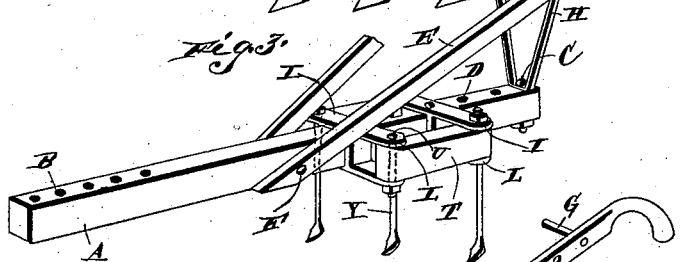
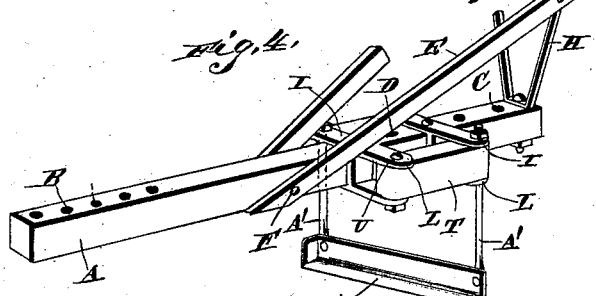
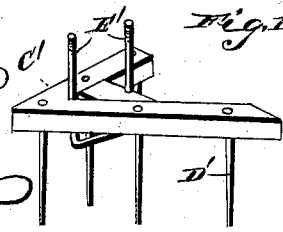
Witnesses
Inventor,
John C. Horton.
By his Attorneys.

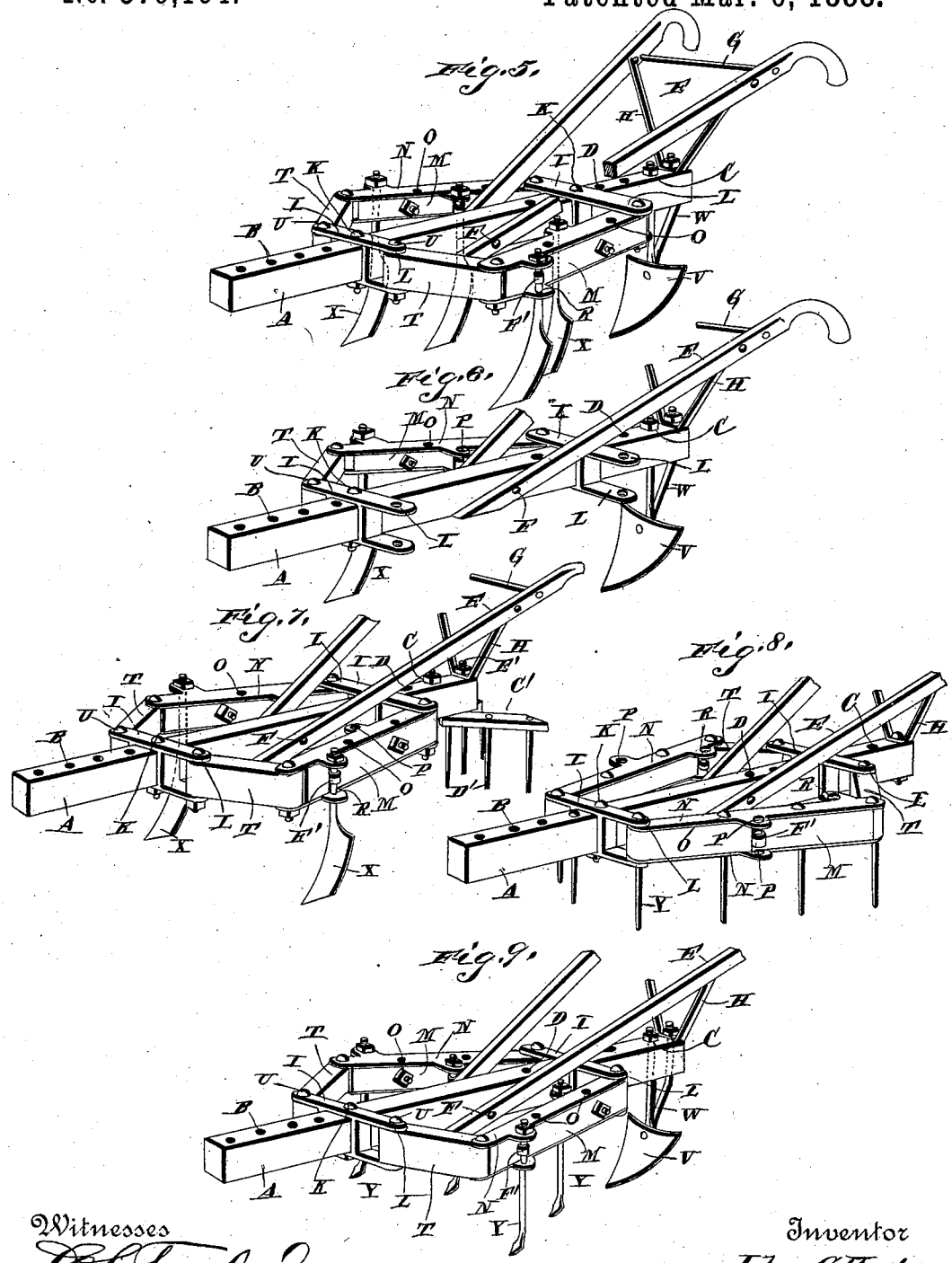

UNITED STATES PATENT OFFICE.

JOHN CAMPBELL HORTON, OF ELKMONT, ALABAMA, ASSIGNOR OF ONE-HALF TO W. W. TODD, OF SAME PLACE.

COMBINED PLOW AND HARROW.

SPECIFICATION forming part of Letters Patent No. 379,164, dated March 6, 1888.

Application filed November 18, 1887. Serial No. 255,518. (No model.)

*To all whom it may concern:*

Be it known that I, JOHN CAMPBELL HORTON, a citizen of the United States, residing at Elkmont, in the county of Limestone and State of Alabama, have invented a new and useful Improvement in Combined Plows, Harrows, and Cultivators, of which the following is a specification.

My invention relates to an improvement in combined plows, harrows, and cultivators; and it consists in the peculiar construction and combination of devices, that will be more fully set forth hereinafter, and particularly pointed out in the claims.

In the accompanying drawings, Figure 1 is a perspective view of my invention when arranged to form a single-shovel plow. Fig. 2 is a similar view of the same when arranged to form a cultivator. Fig. 3 is a similar view of the same when arranged to form a side harrow. Fig. 4 is a similar view of the same when arranged to form a cotton-scraper. Fig. 5 is a similar view of the same when arranged to form a flexible or adjustable cultivator. Fig. 6 is a similar view of the same when arranged to form a double-shovel cultivator. Fig. 7 is a similar view of the same when arranged to form a corn-planter. Fig. 8 is a similar view of the same when arranged to form a V-harrow. Fig. 9 is a similar view of the same when arranged to form a double side harrow. Figs. 10 and 11 are detail views.

A represents the beam, which is provided on its front end with a series of vertical openings, B, and is provided at its rear end with a pair of vertical openings, C, one of which is arranged in front of the other, and in advance of the openings C are a series of vertical openings, D.

E represents a pair of handles, which have their lower ends connected to the beam near the center thereof by means of a transverse bolt, F, which extends through a transverse opening in the beam, and the said handles are connected together near their outer ends by means of a cross-bar, G.

H represents a supporting-yoke, which has its central portion secured on the rear end of the beam, and has its upwardly-extending diverging arms secured at their upper ends to the handles, as shown.

I represents a pair of slide-boxes, which are adapted to be fitted on the beam, are longitudinally adjustable thereon, and may be secured thereto at any desired position by means of bolts K, which are adapted to pass through central openings in the slide-boxes and through the openings B and D of the beam. The said slide-boxes are provided at their ends with outwardly-projecting pairs of ears L.

M represents a pair of arms, which are provided on their upper and lower sides with metallic plates N, the said plates projecting beyond one end of each of the said arms. Each of the said arms is provided with a pair of vertical central openings, O, which are arranged at equal distances from the ends of the arms, and the said arms are further provided at their centers, near their inner edges, each with a single vertical opening, P, and have, near their front ends, near their outer edges, each a single vertical opening, R. Transverse openings S are made in the arms M, which transverse openings intersect and communicate with the openings P R.

T represents a pair of links, which are adapted to be bolted at their outer ends between the projecting portions of the plate N on the arms M, and have their inner ends adapted to be secured between the projecting ears of the front box, I, by vertical bolts U.

V represents a shovel-plow, which is provided with a pair of standards, W, arranged one in front of the other and adapted to have their upper ends passed through the openings C in the beam and secured in position by clamping-nuts screwed onto their upper ends and bearing upon the beam. The rear standard is also adapted to pass through the central portion of the yoke and secure the latter to the beam.

X represents a series of four bull-tongues, which are curved, as shown, and provided with vertical shanks or standards that are adapted to be passed through the openings in the arms M or the openings in the plow-beam.

Y represents a series of harrow-teeth, which correspond in number with the bull-tongues and have their lower ends flattened and inclined, as shown.

Z represents a scraper, which is provided with a pair of standards, A', which standards are adapted to be secured in the vertical openings in the arms M.

C' represents a V-shaped frame, which is provided with a series of downwardly-extending teeth, D'.

The clip-bolt E' is provided for the said frame, which clip-bolt is adapted to be passed through openings in the frame and through a pair of openings near the rear end of the beam to secure the frame to the latter. The bull-tongues, when they are inserted in the openings P R, are secured therein at any desired adjustment by means of eyebolts F', the shanks of the said bull-tongues passing through the eyes of the eyebolts and the shanks of the said eyebolts passing through the openings S of the arms M.

In order to arrange the implement to form a single shovel plow, the slide-boxes, the arms, and the links are discarded, and the shovel-plow V has its standards or shanks secured in two of the openings D near the rear end of the plow-beam, as shown in Fig. 1.

If it is desired to arrange the implement to form a triple shovel cultivator, the shovel V is removed from the beam, the slide-boxes I are secured thereto near its rear end, the arms M have their ends secured between the projecting ends of the slide-boxes, and one of the bull-tongues has its shank or standard secured in one of the openings D of the beam, and two of the said bull-tongues have their shanks or standards secured in openings at diagonally-opposite points of the arms M, as shown in Fig. 2.

If it be desired to employ the implement as a side harrow, the bull-tongues are discarded and the harrow-teeth are employed in lieu thereof, as shown in Fig. 3.

In order to adapt the implement for use as a cotton-scraper, the harrow-teeth are moved and the standards of the scraper Z are secured in diagonally-opposite corners of the arms M, as shown in Fig. 4.

In order to adapt the implement for use as a flexible or adjustable cultivator, the links T are inserted between the front ends of the arms M and the ends of the front slide-box, I. The shovel V has its standards secured to the rear end of the beam and the bull-tongues are secured to the arm M, as shown in Fig. 5.

In order to arrange the implement as a double-shovel cultivator, one of the arms M and one of the links are discarded, and leave only one of the bull-tongues attached to the arm M, as shown in Fig. 6.

In order to arrange the implement for the use of a corn-planter, I employ both the arms M and both of the links, attach a bull-tongue to each of the arms M, and secure the V-shaped frame, having the teeth, to the rear end of the plow-beam in lieu of the shovel V, as shown in Fig. 7.

In Fig. 8 I illustrate the implement when adapted for use as a V-harrow, in which case I attach the front ends of the arms M to the ends of the front slide-box, and connect the links to the rear ends of the arms M and to the ends of the rear slide-box, and secure harrow-teeth to the arms M and to the beam, as shown.

In Fig. 9 the implement is arranged to form a double side-harrow, the arms M having their rear ends attached to the ends of the rear slide-box, the links being attached to the front ends of the arms M and to the ends of the front slide-box, harrow-teeth being attached to the side arms, M, and the shovel V being attached to the rear end of the beam.

From the foregoing description it will be understood that an implement embodying my improvements is adapted to be used for a number of different purposes, is very simple in construction, is strong and durable, and will be found of great practical utility to farmers and gardeners.

Having thus described my invention, I claim—

1. The combination, in a cultivator, with the beam A and boxes I, of the arms M, having the vertical openings P R and the transverse openings S, communicating with and intersecting the same, the bull-tongues or teeth having their shanks secured in the vertical openings, and the eyebolts having their shanks inserted in the openings S and their eyes in engagement with the shanks of the shovels or teeth, substantially as described.

2. The combination of the beam, the boxes secured thereto and longitudinally adjustable thereon, the arms M, secured to one of the boxes, and the links T, connecting the opposite ends of the said arms to the remaining box, substantially as described.

3. The combination of the beam, the slide-boxes secured thereto and having the projecting ears, the arms M, the links T, and the bolts to connect the said links and arms together and to the ears of the slide-boxes, substantially as described.

In testimony that I claim the foregoing as my own I have hereto affixed my signature in presence of two witnesses.

JOHN CAMPBELL HORTON.

Witnesses:
F. S. WOOD,
J. C. GORDON.